(12) United States Patent
Brown

(10) Patent No.: US 10,505,446 B2
(45) Date of Patent: *Dec. 10, 2019

(54) CIRCUITS, DEVICES AND METHODS FOR BYPASSING VOLTAGE REGULATION IN VOLTAGE REGULATORS

(71) Applicant: SKYWORKS SOLUTIONS, INC., Woburn, MA (US)

(72) Inventor: David Alan Brown, San Jose, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,582

(22) Filed: Jul. 7, 2018

(65) Prior Publication Data

US 2018/0316264 A1    Nov. 1, 2018

Related U.S. Application Data

(63) Continuation of application No. 14/754,131, filed on Jun. 29, 2015, now Pat. No. 10,038,373.

(Continued)

(51) Int. Cl.
*H02M 3/156* (2006.01)
*H02M 1/00* (2006.01)

(52) U.S. Cl.
CPC .... *H02M 3/156* (2013.01); *H02M 2001/0016* (2013.01); *H02M 2001/0025* (2013.01)

(58) Field of Classification Search
CPC ......... H02M 3/156; H02M 2001/0025; H02M 2001/0016

See application file for complete search history.

(56) References Cited

U.S. PATENT DOCUMENTS 5,629,608 A * 5/1997 Budelman ............... G05F 1/618
                                                323/268
5,929,615 A * 7/1999 D'Angelo ............... G05F 1/618
                                                323/222

(Continued)

FOREIGN PATENT DOCUMENTS

CN    102315774    1/2012
CN    102946451    2/2013
TW    200619876    6/2006

OTHER PUBLICATIONS

PCT/US2015/038356, Circuits, Devics and Methods for Bypassing Voltage Regulation in Voltage Regulators, filed Jun. 29, 2015.

*Primary Examiner* — Alex Torres-Rivera
*Assistant Examiner* — Sisay G Tiku
(74) *Attorney, Agent, or Firm* — Chang & Hale LLP

(57) ABSTRACT

Circuits, devices, and method for bypassing voltage regulation in voltage regulators. A voltage regulator may include a duty cycle component configured to determine whether a duty cycle of the voltage regulator is greater than a threshold duty cycle. The voltage regulator may also include a first sensing component configured to determine whether an output voltage of the voltage regulator is less than a first threshold voltage. The voltage regulator may further include a regulating component, coupled to the duty cycle component and the first sensing component, the regulating component configured to pass an input voltage to the output of the voltage regulator based on a first determination that the duty cycle is greater than the threshold duty cycle and a second determination that the output voltage of the voltage regulator is less than the first threshold voltage.

20 Claims, 7 Drawing Sheets

Related U.S. Application Data

(60) Provisional application No. 62/019,021, filed on Jun. 30, 2014.

(56) References Cited

U.S. PATENT DOCUMENTS

| | | | |
|---|---|---|---|
| 9,246,383 B2* | 1/2016 | Brewster | H02M 3/156 |
| 2004/0245974 A1* | 12/2004 | Kitani | H02M 1/36 |
| | | | 323/284 |
| 2005/0110469 A1* | 5/2005 | Inaba | H02M 3/156 |
| | | | 323/222 |
| 2006/0113962 A1 | 6/2006 | Spiridon | |
| 2008/0030183 A1 | 2/2008 | Valentino | |
| 2009/0134861 A1 | 5/2009 | Saeki et al. | |
| 2010/0308783 A1* | 12/2010 | Farley | H02M 3/156 |
| | | | 323/282 |
| 2011/0148385 A1* | 6/2011 | North | G05F 3/16 |
| | | | 323/304 |
| 2013/0043828 A1* | 2/2013 | Gurlahosur | H02J 7/0081 |
| | | | 320/107 |

\* cited by examiner

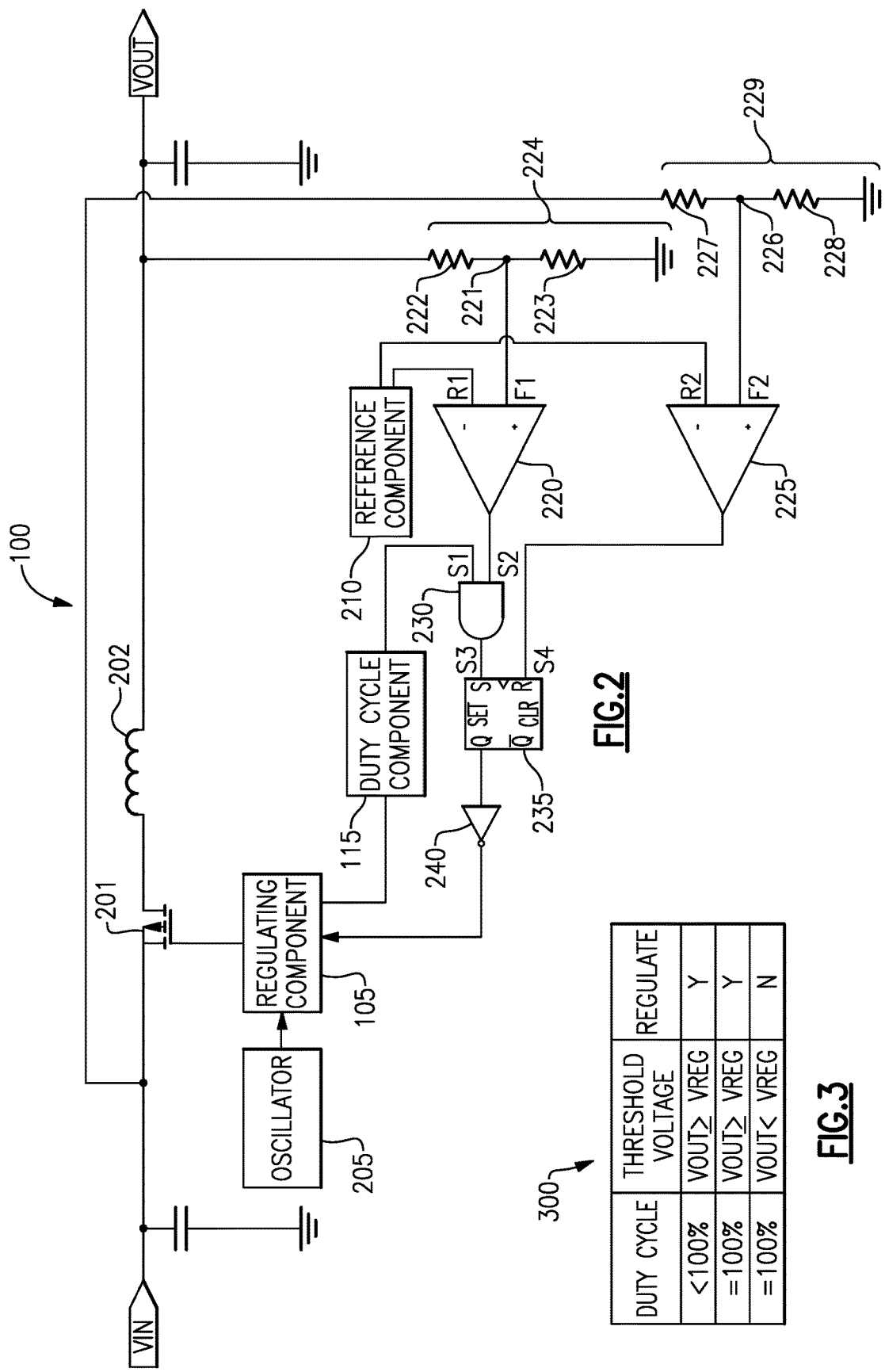

CIRCUITS, DEVICES AND METHODS FOR BYPASSING VOLTAGE REGULATION IN VOLTAGE REGULATORS

CROSS-REFERENCE TO RELATED APPLICATION(S)

This application is a continuation of U.S. application Ser. No. 14/754,131 filed Jun. 29, 2015, entitled CIRCUITS, DEVICES AND METHODS FOR BYPASSING VOLTAGE REGULATION IN VOLTAGE REGULATORS, which claims priority to U.S. Provisional Application No. 62/019,021 filed Jun. 30, 2014, entitled CIRCUITS, DEVICES AND METHODS FOR BYPASSING VOLTAGE REGULATION IN VOLTAGE REGULATORS. The contents of each of the above-referenced application(s) are hereby expressly incorporated by reference herein in their entireties for all purposes.

BACKGROUND

Field

The present disclosure generally relates to voltage regulators and/or wireless communication systems that include voltage regulators.

Description of Related Art

A voltage regulator may receive an input voltage and may regulate the input voltage to generate an output voltage. For example, the voltage regulator may maintain a constant output voltage when the input voltage varies. When the input voltage drops below a certain voltage, the duty cycle of the voltage regulator may increase (e.g., may increase to a one-hundred percent duty cycle). When the voltage regulator operates at higher duty cycles, the voltage regulator may generate more noise and/or may use more power.

SUMMARY

In some implementations, the present disclosure relates to a voltage regulator including a duty cycle component configured to determine whether a duty cycle of the voltage regulator is greater than a threshold duty cycle. The voltage regulator also includes a first sensing component configured to determine whether an output voltage of the voltage regulator is less than a first threshold voltage. The voltage regulator further includes a regulating component, coupled to the duty cycle component and the first sensing component, the regulating component configured to pass an input voltage to the output of the voltage regulator based on a first determination that the duty cycle is greater than the threshold duty cycle and a second determination that the output voltage of the voltage regulator is less than the first threshold voltage.

In some embodiments, the regulating component is further configured to regulate the output of the voltage regulator based on a third determination that the duty cycle is less than or equal to the threshold duty cycle or a fourth determination that the output voltage of the voltage regulator is greater than or equal to the first threshold voltage.

In some embodiment, the voltage regulator may further include a second sensing component coupled to the regulating component, the second sensing component configured to determine whether the input voltage of the voltage regulator is greater than a second threshold voltage.

In some embodiments, the regulating component is further configured to regulate the output of the voltage regulator based on a fifth determination that the input voltage of the voltage regulator is greater than the second threshold voltage.

In some embodiments, the second threshold voltage is greater than the first threshold voltage.

In some embodiments, the first sensing component includes a first comparator.

In some embodiments, the second sensing component includes a second comparator.

In some embodiments, the first comparator is coupled to the output of the voltage regulator and a reference component.

In some embodiments, the second comparator is coupled to the output of the voltage regulator and the reference component.

In some embodiments, the regulating component includes a metal-oxide-semiconductor field-effect transistor (MOSFET).

In some embodiments, the MOSFET is configured to pass the input voltage to the output of the voltage regulator or to regulate the output of the voltage regulator.

In some implementations, the present disclosure relates to an electronic device including a voltage source configured to provide an input voltage. The electronic device also includes a voltage regulator coupled to the voltage source, the voltage regulator including a duty cycle component configured to determine whether a duty cycle of the voltage regulator is greater than a threshold duty cycle, a first sensing component configured to determine whether an output voltage of the voltage regulator is less than a first threshold voltage, and a regulating component, coupled to the duty cycle component and the first sensing component, the regulating component configured to pass the input voltage to the output of the voltage regulator based on a first determination that the duty cycle is greater than the threshold duty cycle and a second determination that the output voltage of the voltage regulator is less than the first threshold voltage.

In some embodiments, the regulating component is further configured to regulate the output of the voltage regulator based on a third determination that the duty cycle is less than or equal to the threshold duty cycle or a fourth determination that the output voltage of the voltage regulator is greater than or equal to the first threshold voltage.

In some embodiments, the voltage regulator further includes a second sensing component coupled to the regulating component, the second sensing component configured to determine whether the input voltage of the voltage regulator is greater than a second threshold voltage.

In some embodiments, the regulating component is further configured to regulate the output of the voltage regulator based on a fifth determination that the input voltage of the voltage regulator is greater than the second threshold voltage.

In some embodiments, the second threshold voltage is greater than the first threshold voltage.

In some embodiments, the first sensing component includes a first comparator.

In some embodiments, the second sensing component includes a second comparator.

In some embodiments, the first comparator is coupled to the output of the voltage regulator and a reference component.

In some embodiments, the second comparator is coupled to the output of the voltage regulator and the reference component.

In some embodiments, the regulating component includes a metal-oxide-semiconductor field-effect transistor (MOSFET).

In some embodiments, the MOSFET is configured to pass the input voltage to the output of the voltage regulator or to regulate the output of the voltage regulator.

In some implementations, the present disclosure relates to a method for operating a voltage regulator. The method includes determining whether a duty cycle of the voltage regulator is greater than a threshold duty cycle. The method also includes determining whether an output voltage of the voltage regulator is less than a first threshold voltage. The method further includes passing an input voltage to the output of the voltage regulator based on a first determination that the duty cycle is greater than the threshold duty cycle and a second determination that the output voltage of the voltage regulator is less than the first threshold voltage.

In some embodiments, the method further includes regulating the output of the voltage regulator based on a third determination that the duty cycle is less than or equal to the threshold duty cycle or a fourth determination that the output voltage of the voltage regulator is greater than or equal to the first threshold voltage.

In some embodiments, the method further includes determining whether the input voltage of the voltage regulator is greater than a second threshold voltage.

In some embodiments, the method further includes regulating the output of the voltage regulator based on a fifth determination that the input voltage of the voltage regulator is greater than the second threshold voltage.

BRIEF DESCRIPTION OF THE DRAWINGS

FIG. 2 is a block diagram illustrating an example voltage regulator 100, according to one embodiment of the present disclosure.

FIG. 3 is a diagram illustrating an example table, according to one embodiment of the present disclosure.

DETAILED DESCRIPTION OF SOME EMBODIMENTS

The headings provided herein, if any, are for convenience only and do not necessarily affect the scope or meaning of the claimed invention.

Disclosed are non-limiting examples of systems, devices, circuits and/or methods related to techniques for regulating an input voltage to generate an output voltage. Such techniques may be implemented in, for example, voltage regulators. Although described in the context of voltage regulators, it will be understood that one or more features of the present disclosure may also be utilized in other applications.

Described herein are examples of how to operate a voltage regulator when the input voltage of the voltage regulator and/or the duty cycle of the voltage regulator varies. In one embodiment, the voltage regulator may monitor the duty cycle, the input voltage and/or the output voltage of the voltage regulator. The voltage regulator may provide the input voltage to an output of the voltage regulator (e.g., bypass one or more components of the voltage regulator that regulate the input voltage) or may regulate the input voltage based on the input voltage, the output voltage, and/or the duty cycle. Although described in the example context of a voltage regulators, it will be understood that one or more features of the present disclosure may also be utilized in other types of voltage regulation applications.

Figure 1:
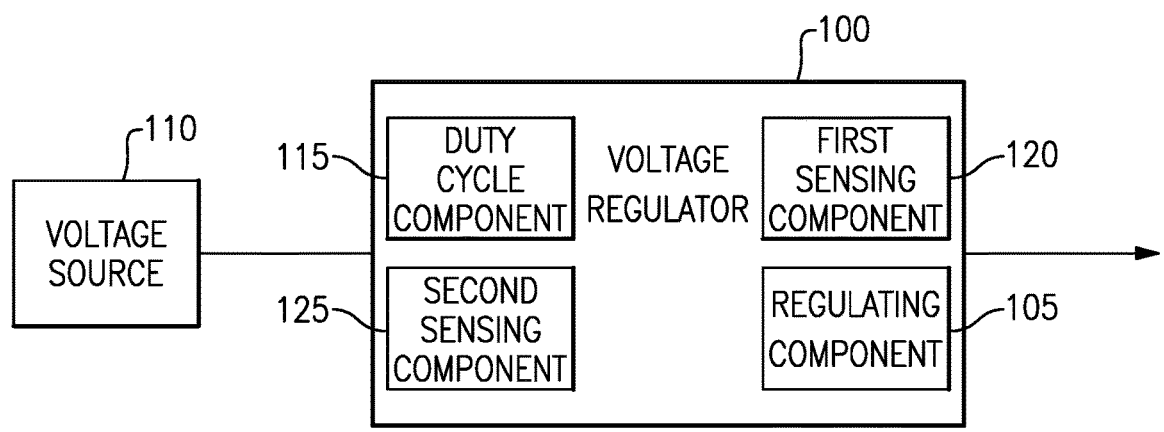
FIG. 1 is a block diagram illustrating a voltage regulator, according to one embodiment of the present disclosure.

FIG. 1 is a block diagram illustrating a voltage regulator 100 according to one embodiment of the present disclosure. In one embodiment, the voltage regulator 100 may be a component that may maintain a constant output voltage level. The voltage regulator 100 may be used to regulate one or more alternating current (AC) and/or direct current (DC) voltages to generate an output voltage. A voltage regulator may also be referred to as a switching regulator. Examples of voltage regulators may include, but are not limited to, a buck regulator, a boost regulator, a buck-boost regulator, etc. The voltage regulator 100 includes a regulating component 105, a duty cycle component 115, a first sensing component 120, and a second sensing component 125.

The voltage regulator 100 is coupled to a voltage source 110. The voltage source 110 may provide an input voltage to the voltage regulator 100 and the voltage regulator 100 may generate an output voltage using the input voltage from the voltage source 110. In one embodiment, the voltage regulator 100 may regulate the input voltage received from the voltage source 110 to generate the output voltage. For example, the voltage regulator 100 may regulate the input voltage provided by the voltage source 110 by generating a fixed output voltage that may remain constant regardless of changes to the input voltage and/or load conditions of the voltage regulator 100. In one embodiment, the regulating component 105 may regulate the input voltage to generate the output voltage. The fixed output voltage of the voltage regulator 100 may also be referred to as a target voltage or a regulated voltage. The output voltage may be provided to other components, circuits, devices, etc., via an output of the voltage regulator 100. For example, the output of the voltage regulator 100 may be coupled to a power amplifier (PA) and the voltage regulator may provide the output voltage to the PA.

In one embodiment, the voltage regulator 100 may regulate the input voltage provided by the voltage source 110 to generate the output voltage when the output voltage (generated by the voltage regulator) is greater than or equal to a first threshold voltage (as discussed in more detail below). The first sensing component 120 may detect and/or determine whether the output voltage is greater than or equal to the first threshold voltage. In another embodiment, the voltage regulator 100 may regulate the input voltage provided by the voltage source 110 to generate the output voltage when the duty cycle (e.g., the percentage and/or amount of time the voltage regulator 100 is operating) is below a threshold duty cycle (as discussed in more detail below). The duty cycle component 115 may detect and/or determine whether the duty cycle is below the threshold duty cycle. In a further embodiment, the voltage regulator 100 may pass the input voltage provided by the voltage source 110 to the output of the voltage regulator without regulating the input voltage when the duty cycle of the voltage regulator 100 is greater than the threshold duty cycle and the output voltage is less than the first threshold voltage (as discussed in more detail below). In one embodiment, when the voltage regulator passes the input voltage to the output of the voltage regulator, the components of the voltage regulator 100 that regulate the input voltage (e.g., portions or components of the regulating component 105) may cease operating to save power and/or to reduce noise. In one embodiment, the voltage regulator 100 may resume regulating the input voltage provided by the voltage source 110 when the input voltage is greater than or equal to a second threshold voltage (as discussed in more detail below). In one embodiment, when the voltage regulator resumes regulating the input voltage, the components of the voltage regulator 100 that regulate the input voltage may resume operation. The second sensing component 125 may detect and/or determine whether the input voltage is greater than or equal to the second threshold voltage.

In one embodiment, the duty cycle of the voltage regulator 100 may increase as the input voltage approaches the target or regulated voltage of the voltage regulator 100. When the input voltage drops to the target/regulated voltage or lower, the duty cycle of the voltage regulator 100 may increase (e.g., may increase to a one-hundred percent duty cycle). When the voltage regulator 100 operates at higher duty cycles, the voltage regulator 100 may generate noise (which may affect the operation and/or performance of other circuits, components, devices, etc.) and/or may use (e.g., consume) more power. Allowing the voltage regulator 100 to pass the input voltage (received from the voltage source 110) to the output of the voltage regulator (e.g., allowing the voltage regulator 100 to bypass one or more components of the voltage regulator that regulate the input voltage) when the input voltage is below the first voltage threshold and when the duty cycle is above the duty cycle threshold may allow the voltage regulator 100 to generate less noise and/or use (e.g., consume) less power. For example, when the output voltage is below the first voltage threshold and when the duty cycle is above the duty cycle threshold, the regulating component 105 may not regulate the input voltage (e.g., the components of the regulating component that regulate the input voltage may cease operation).

FIG. 2 is a block diagram illustrating an example voltage regulator 100 according to one embodiment of the present disclosure. As discussed above, the voltage regulator 100 may be coupled to a voltage source (e.g., voltage source 110 illustrated in FIG. 1) and the voltage source may provide an input voltage VIN to the voltage regulator 100. Also as discussed above, the voltage regulator 100 may regulate the input voltage VIN (e.g., an alternating current (AC) and/or direct current (DC) voltage) to generate an output voltage VOUT (e.g., a target voltage or a regulated voltage) and/or may pass the input voltage VIN to the output of the voltage regulator 100 (e.g., may bypass the regulating component 105 and may provide the input voltage VIN directly to the output of the voltage regulator 100). The example voltage regulator 100 includes a regulating component 105. The regulating component 105 may be coupled to a switch 201, an oscillator 205, duty cycle component 115, and an inverter 240.

The duty cycle component is coupled to a logical component 230 (e.g., an AND gate or any device, component, circuit, etc., that may implement a logical conjunction). In one embodiment, the duty cycle component 115 may monitor the duty cycle (e.g., the percentage and/or amount of time the regulating component 105 is operating or regulating the input voltage VIN) of the regulating component 105. The duty cycle component 115 may produce a signal S1 having a logic high state when the duty cycle of the regulating component 105 is greater than or equal to a threshold duty cycle. For example, the duty cycle component 115 may produce a signal S1 having a logic high state (e.g., a "1") when the duty cycle of the regulating component 105 is greater than or equal to 85%, 90%, 100%, etc. The duty cycle component 115 may produce a signal S1 having a logic low state (e.g., a "0") when the duty cycle of the regulating component 105 is less than the threshold duty cycle. For example, the duty cycle component 115 may produce a signal S1 having a logic low state when the duty cycle of the regulating component 105 is less than 85%, 90%, 100%, etc.

The logical component 230 is also coupled to a comparator 220. The comparator 220 may be an example of a sensing component. In other embodiments, a sensing component may be any combination of devices, circuits, modules, components, etc., that may be used to determine whether a first voltage is greater than a second voltage. The comparator 220 is coupled to a first resistor divider 224 and a reference component 210. A first resistor divider 224 may include a first resistance 222 (e.g., a resistor or any component, device, circuit, etc., that may implement electrical resistance) and a second resistance 223 (e.g., a resistor or any component, device, circuit, etc., that may implement electrical resistance) connected in series through node 221. The second resistance 223 may be coupled to a ground so as to form a resistor divider circuit. The first and second resistance values (of the first resistance 222 and the second resistance 223, respectively) may or may not be the same. Configured in such an example manner, the output voltage VOUT may be divided down by the first resistor divider 224 to produce a proportionally smaller voltage F1 at node 221. The reference component 210 may generate a first threshold voltage R1 and may provide the first threshold voltage R1 to the comparator 220. The first threshold voltage R1 may also be referred to as a dropout voltage. In one embodiment, the dropout voltage may be a voltage at which the voltage regulator 100 is no longer able to regulate the input voltage VIN.

In one embodiment, the comparator 220 may compare the voltage F1 with the first threshold voltage R1. When F1 is less than R1, the comparator 220 may produce a signal S2 having a logic high state (e.g., a "1"). When F1 is greater than or equal to R1, the comparator 220 may produce a signal S2 having a logic low state (e.g., a "0"). In one embodiment, the logical component 230 may produce a signal S3 based on the signal S1 and the signal S2. The logical component 230 may produce a signal S3 having a logic high state when both the signal S2 and the signal S3 have a logic high state. For example, the logical component 230 may produce a signal S3 having a logic high state when the output voltage VOUT is less than the first threshold voltage and the duty cycle is greater than or equal to the threshold duty cycle. The logical component 230 may produce a signal S3 having a logic low state when one or more of the signal S2 and the signal S3 have a logic low state. For example, the logical component 230 may produce a signal S3 having a logic low state when the output voltage VOUT is greater than or equal to the first threshold voltage and/or the duty cycle is less than the threshold duty cycle.

The comparator 225 is coupled to a second resistor divider 229 and the reference component 210. The comparator 225 may be an example of a sensing component. In other embodiments, the sensing component may be any combination of devices, circuits, modules, components, etc., that may be used to determine whether a first voltage is greater than a second voltage. The second resistor divider 229 may include a first resistance 227 (e.g., a resistor or any component, device, circuit, etc., that may implement electrical resistance) and a second resistance 228 (e.g., a resistor or any component, device, circuit, etc., that may implement electrical resistance) connected in series through node 226. The second resistance 228 may be coupled to a ground so as to form a resistor divider circuit. The first and second resistance values (of the first resistance 227 and the second resistance 228, respectively) may or may not be the same. Configured in such an example manner, the input voltage VIN may be divided down by the second resistor divider 229 to produce a proportionally smaller voltage F2 at node 226. The reference component 210 may generate a second threshold voltage R2 and may provide the second threshold voltage R2 to the comparator 225. In one embodiment, the comparator 225 may compare the voltage F2 with the first threshold voltage R2. When F2 is less than R2, the comparator 225 may produce a signal S4 having a logic low state (e.g., a "0"). When F2 is greater than or equal to R2, the comparator 225 may produce a signal S2 having a logic high state (e.g., a "1").

As illustrated in FIG. 2, the logical component 230 and the comparator 225 may be coupled to flip-flop 235. In one embodiment, the flip-flop 235 may be an SR flip-flop. In other embodiments, other types of flip-flops and/or other devices, components, circuits, etc., which are capable of retaining a current state may be used. The logical component 230 may provide the signal S3 to the flip-flop 235 and the comparator 225 may provide the signal S4 to the flip-flop 235. The flip-flop 235 may generate a signal S5 based on the signals S3 and S4 (received from the logical component 230 and the comparator 225, respectively). For example, when the signal S3 has a logical low state (e.g., a "0") and the signal S4 has a logical low state, the flip-flop 235 may generate a signal S5 having a logical low state. In another example, when the signal S3 has a logical high state and the signal S4 has a low high state, the flip-flop 235 may generate a signal S5 having a logical low state. In a further example, when the signal S3 has a logical high state and the signal S4 has a logical high state, the flip-flop 235 may generate a signal S5 having a logical high state.

The flip-flop 235 is coupled to an inverter 240. The inverter 240 may invert (e.g., flip or reverse) the signal S5 received from the flip-flop 235 to generate the signal S6. For example, if the signal S5 has a logical high state, the inverter 240 may invert the signal S5 to generate a signal S6 with a logical low state. In another example, if the signal S5 has a logical low state, the inverter 240 may invert the signal S5 to generate a signal S6 with a logical high state.

As discussed above, the inverter 240 is coupled to the regulating component 105. The regulating component 105 may use the signal S6 (received from the inverter 240) to determine whether the regulating component 105 should pass the input voltage VIN to the output of the voltage regulator 100 (e.g., bypass the regulation of the input voltage VIN) or regulate the input voltage VIN to generate the output voltage VOUT. For example, the regulating component 105 may regulate the input voltage VIN when the output voltage VOUT is greater than or equal to the first threshold voltage. In another example, the regulating component 105 may regulate the input voltage VIN when the duty cycle of the voltage regulator 100 is below a threshold duty cycle. In a further example, the voltage regulator 100 may pass the input voltage provided by the voltage source 110 to the output of the voltage regulator 100 without regulating the input voltage when the duty cycle of the voltage regulator 100 is greater than the threshold duty cycle and the output voltage VOUT is less than the first threshold voltage. In one embodiment the components of the regulating component 105 that regulate the input voltage may cease operating to save power and/or to reduce noise when passing the input voltage VIN to the output. In yet another example, the voltage regulator 100 may resume regulating the input voltage provided by the voltage source 110 when the input voltage is greater than or equal to a second threshold voltage.

In one embodiment, the regulating component 105 may use the switch 201 to pass the input voltage VIN to the output of the voltage regulator 100 or to regulate the input voltage VIN to generate the output voltage VOUT. For example, when the regulating component 105 determines that the output voltage VOUT is greater than or equal the first threshold voltage and/or the duty cycle of the voltage regulator 100 is below a threshold duty cycle, the regulating component 105 may configure the switch 201 such that the input voltage VIN is provided to the regulating component 105 so that the regulating component 105 may regulate the input voltage VIN. In another example, when the regulating component 105 determines that the input voltage VIN is less than the first threshold voltage and the duty cycle of the voltage regulator 100 is greater than or equal to the threshold duty cycle, the regulating component 105 may configure the switch 201 such that the input voltage VIN is passed to the output of the voltage regulator (e.g., such that the input voltage VIN bypasses the portions of the regulating component 105 that regulate the input voltage VIN and is provided directly to the output of the voltage regulator 100). In a further example, after configuring the switch 201 to provide the input voltage VIN to the output of the voltage regulator 100 (e.g., to bypass the regulating component 105), the regulating component 105 may configure (or reconfigure) the switch 201 such that the input voltage VIN is provided to the portions of the regulating component 105 that regulate the input voltage VIN when the regulating component 105 determines that the input voltage VIN is greater than or equal to a second threshold voltage. In one embodiment, the components of the regulating component 105 that regulate the input voltage VIN may resume operation when the input voltage VIN is greater than or equal to a second threshold voltage.

In one embodiment, the switch 201 may be a P-channel metal-oxide-semiconductor field-effect transistor (MOSFET). In other embodiments, the switch 201 may be another type of MOSFET (e.g., an N-channel MOSFET). In further embodiments, the switch 201 may be any combination of devices, components, circuits, etc., that may be used to selectively pass the input voltage VIN to the output of the voltage regulator or to provide the input voltage VIN to the portions of the regulating component 105 that regulate the input voltage VIN.

The voltage regulator 100 also includes an inductance 202 that may be coupled to the output of the switch 201. The inductance 202 may be provided by an inductor, by some or all of the path to the output of the voltage regulator 100, or some combination thereof. The inductance 202 may be configured to build energy as it charge the output to yield the output voltage VOUT to the output of the voltage regulator.

FIG. 3 is a diagram illustrating an example table 300. The table 300 may illustrate the operation of a voltage regulator (e.g., the voltage regulator 100 illustrated in FIG. 2) when the voltage regulator operates at different duty cycles and generates different output voltages (VOUT). The table 300 includes three columns. The first column is labelled "DUTY CYCLE," the second column is labelled "THRESHOLD VOLTAGE" and the third column is labelled "REGULATE." Each row of the table 300 may indicate whether the voltage regulator will regulate the input voltage VIN for different duty cycles and VOUT voltages.

As illustrated in FIG. 3, the first row of the table 300 may indicate that when the duty cycle of the voltage regulator is less than 100% and the output voltage VOUT of the voltage regulator is greater than or equal to a threshold voltage (VREG), the voltage regulator may regulate the input voltage VIN to generate the output voltage VOUT. The second row of the table 300 may indicate that when the duty cycle of the voltage regulator is equal to 100% and the output voltage VOUT of the voltage regulator is greater than or equal to a threshold voltage (VREG), the voltage regulator may regulate the input voltage VIN to generate the output voltage VOUT. The third row of the table 300 may indicate that when the duty cycle of the voltage regulator is equal to 100% and the output voltage VOUT of the voltage regulator is less than a threshold voltage (VREG), the voltage regulator may not regulate the input voltage VIN. For example, the voltage regulator may bypass portions of a regulating component of the voltage regulator and/or may provide the input voltage VIN to the output of the voltage regulator.

Although the table 300 illustrates a threshold duty cycle of 100%, in other embodiments, other threshold duty cycles may be used. For example, a threshold duty cycle of 75% may be used or a threshold duty cycle of 95% may be used.

Figure 4:
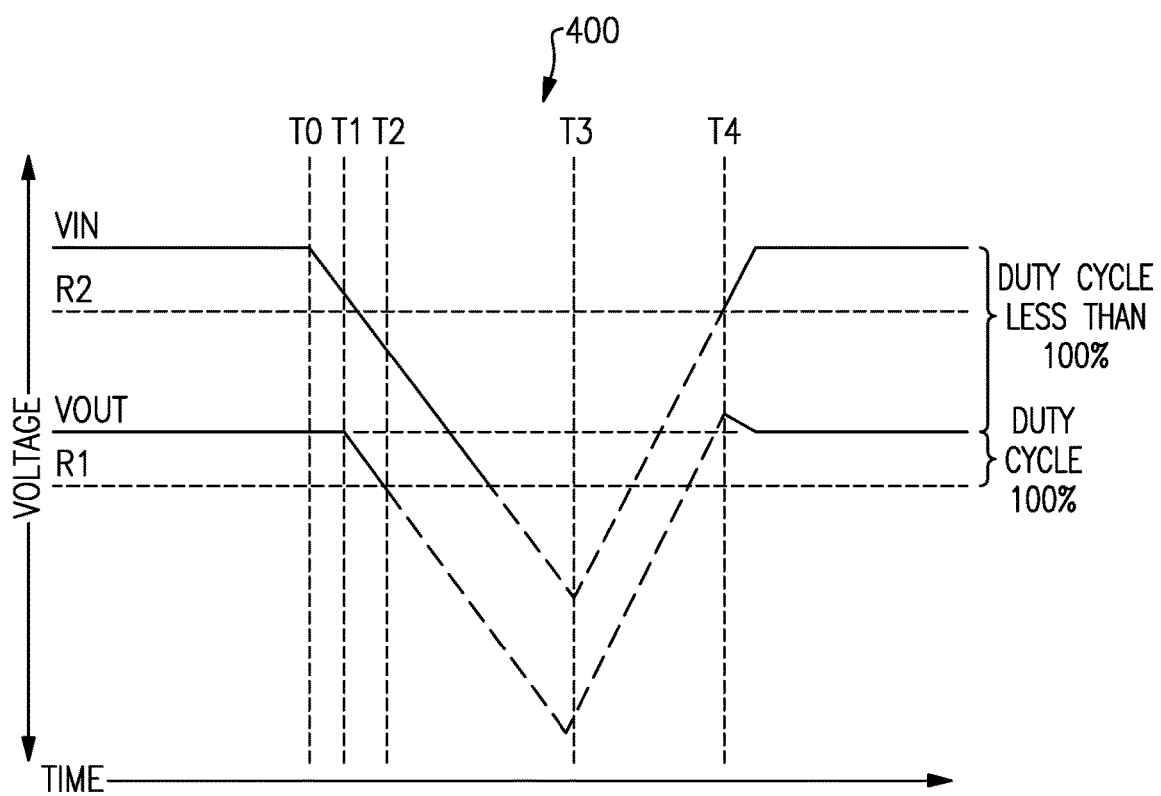
FIG. 4 is a diagram illustrating an example timing configuration that may be implemented in an example voltage regulator, according to one embodiment of the present disclosure.

FIG. 4 is a diagram illustrating an example timing configuration 400 that may be implemented in the example voltage regulator 100 of FIG. 2. The X-axis of the timing configuration 400 may represent different times. The Y-axis of the timing configuration may represent different voltages. The timing configuration 400 includes a line VIN which may represent the changes to an input voltage of the voltage regulator over time. The timing configuration 400 also includes a line VOUT which may represent the changes to an output voltage of the voltage regulator over time. The timing configuration 400 also includes lines R1 and R2 which may indicate a first threshold voltage and a second threshold voltage, respectively. The timing configuration further includes lines T0, T1, T2, T3, and T4 which may indicate different points in time along the X-axis of the timing configuration 400.

As illustrated in FIG. 4, the input voltage begins to drop at time T0. In one embedment, the voltage regulator is regulating the input voltage VIN to generate the output voltage VOUT prior to the time T0. At time T1, the output voltage beings to drop. Although the output voltage VOUT may be based on the input voltage VIN, the output voltage VOUT begins to drop at a later time (e.g., at time T1 instead of at time T0). The voltage regulator begins to operate at a 100% duty cycle at time T1. The voltage regulator may operate at a 100% duty cycle because the voltage regulator may be continuously regulating the input voltage VIN because the input voltage VIN has dropped. Also as illustrated in FIG. 4, the output voltage VOUT may track the input voltage VIN. For example, the output voltage VOUT may drop at the same rate as the VIN voltage. In one embodiment, the difference between the output voltage VOUT and the input voltage VIN may be the summed resistance of a switch (e.g., switch 201 illustrated in FIG. 2) and an inductor (e.g., inductances 202 illustrated in FIG. 2) that may be provided between the input of the voltage regulator and the output of the voltage regulator. At time T2, the voltage output voltage drops to the threshold voltage R1. The threshold hold R1 may be referred to as a dropout voltage for the voltage regulator. In one embodiment, at time T2, the voltage regulator may be configured to pass the input voltage VIN to the output of the voltage regulator (e.g., may be configured to bypass portions of the example regulating component illustrated in FIGS. 1 and 2 that regulate the input voltage VIN). For example, referring back to FIG. 2, the regulating component 105 may configure the switch 201 such that the input voltage VIN is provided to the output of the voltage regulator 100 (e.g., provided directly to the output of the voltage regulator 100). As discussed above, the portions of the regulating component that regulate the input voltage VIN may cease operating (e.g., may be turned off or shut down) to save power and/or to reduce the amount of noise generated by the voltage regulator.

At time T3, the input voltage VIN begins to increase. In one embodiment, although the input voltage VIN is increasing, the voltage regulator may continue to pass the input voltage VIN to the output of the voltage regulator until the input voltage is greater than or equal to the second threshold voltage R2. This may allow the voltage regulator to avoid frequently switching between regulating the input voltage and passing the input voltage to the output (e.g., bypassing a regulating component). At time T4, the input voltage VIN is greater than equal to the second threshold voltage R2. In one embodiment, the voltage regulator may resume regulating the input voltage VIN to generate the output voltage VOUT at time T4. For example, referring back to FIG. 2, the regulating component 105 may configure the switch 201 such that the input voltage VIN is provided to the regulating component 105 so that the regulating component 105 may regulate the input voltage VIN. As discussed above, the portions of the regulating component that regulate the input voltage VIN may resume operating (e.g., may be turned on). As illustrated in FIG. 4, the voltage regulator operates at a 100% duty cycle between times T1 and T4 and operates at less than a 100% duty cycle between times T0 and T1 and after time T4.

Figure 5:
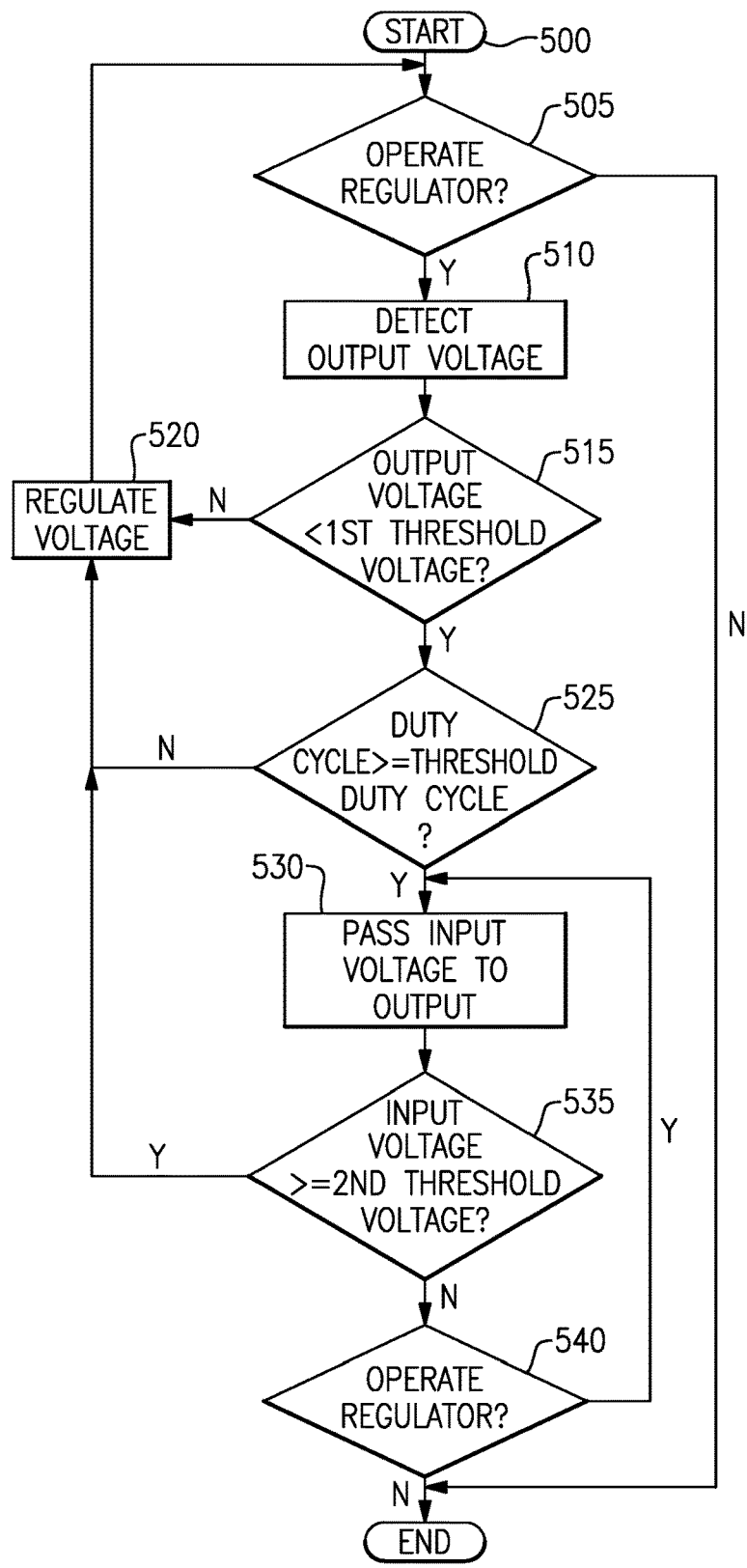
FIG. 5 is a diagram illustrating an example process for operating a voltage regulator having one or more features as described herein, according to one embodiment of the present disclosure.

FIG. 5 is a diagram illustrating an example process 500 for operating a voltage regulator having one or more features as described herein, according to one embodiment of the present disclosure. At block 505, the voltage regulator may determine whether the voltage regulator should continue to operate. For example, the voltage regulator may determine whether an electronic device that includes the voltage regulator is still operating or has been shut off or turned off by a user. If the voltage regulator should not continue to operate, the process 500 ends. If the voltage regulator should continue to operate, the output voltage of the voltage regulator is detected at block 510. At block 515, the voltage regulator may determine whether the output voltage of the voltage regulator is less than a first threshold voltage. For example, referring back to FIG. 2, a first comparator may determine whether the output voltage VOUT is less than the voltage R1. If the output of the voltage regulator is not less than the first threshold voltage, the voltage regulator regulates the input voltage at block 520. After block 520, the process 500 may proceed to block 505.

If the output of the voltage regulator is less than the first threshold voltage, the voltage regulator may determine whether the duty cycle of the voltage regulator is greater than or equal to a threshold duty cycle (e.g., is greater than or equal to 75%, 80%, 90%, 100%, etc.). For example, a duty cycle component (as illustrated in FIG. 2) may analyze the duty cycle of the voltage regulator. If the duty cycle of the voltage regulator is not greater than or equal to a threshold duty cycle (e.g., is less than the threshold duty cycle), the voltage regulator may regulate the voltage at block 520. If the duty cycle of the voltage regulator is greater than or equal to a threshold duty cycle, the voltage regulator may pass the input voltage to the output of the voltage regulator at block 530 (e.g., may bypass the portions of the regulating component that regulate the input voltage).

At block 535, the voltage regulator may determine whether the input voltage of the voltage regulator is greater than or equal to a second threshold voltage. For example, referring back to FIG. 2, a second comparator may determine whether the input voltage VIN is greater than or equal to the voltage R2. If the input voltage is greater than or equal to the second threshold voltage, the voltage regulator may regulate the input voltage at block 520. If the input voltage is less than the second threshold, the voltage regulator may determine whether the voltage regulator should continue to operate at block 540. If the voltage regulator should continue operating the voltage regulator may continue to pass the input voltage to the output at the voltage regulator at block 530 (e.g., continue to bypass one or more components of the voltage regulator that regulate the input voltage). If the voltage regulator should not continue operating, the process 500 ends.

In one embodiment, blocks 505 and/or blocks 540 may be optional. For example, the voltage regulator may perform the process illustrated in FIG. 5 (without blocks 505 and/or 540) until an electronic device that includes the voltage regulator is shut down (e.g., is turned off or powered off).

Figure 6:
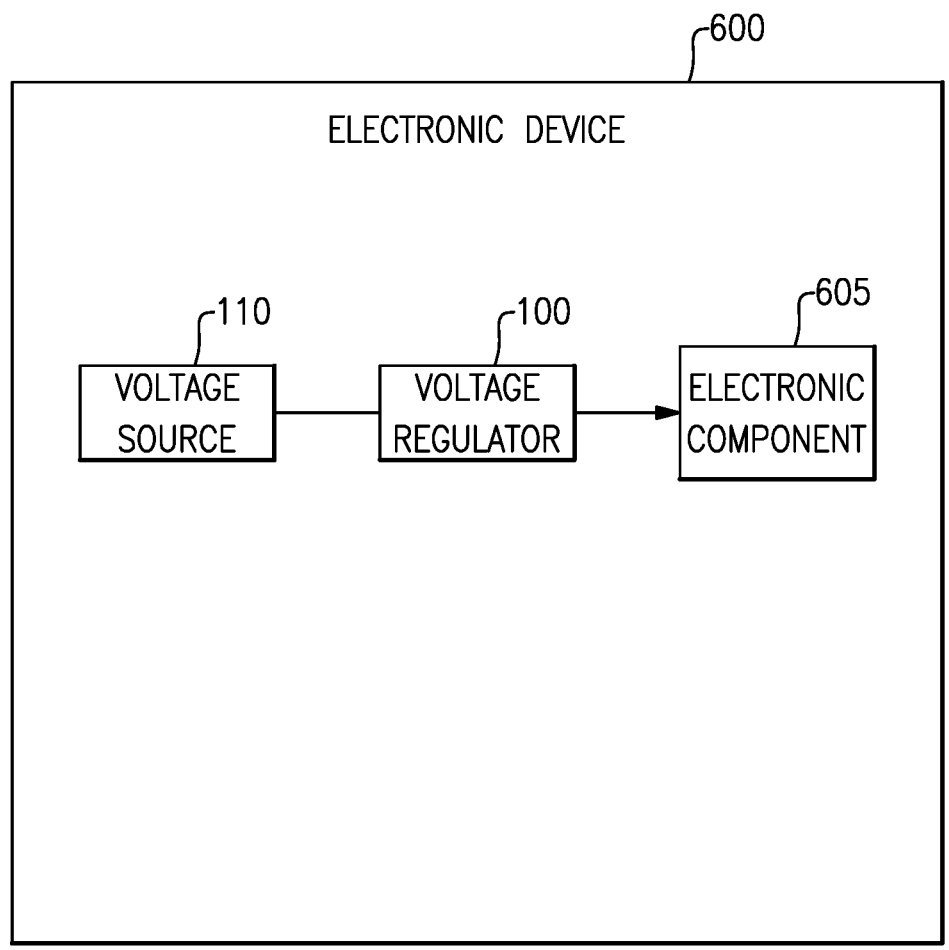
FIG. 6 is a block diagram illustrating an example electronic device, according to one embodiment of the present disclosure.

FIG. 6 is a block diagram illustrating an example electronic device 600 according to one embodiment of the present disclosure. Examples of electronic devices may include, but are not limited to, a cellular phone, a smartphone, a hand-held wireless device with or without phone functionality, a tablet, a laptop computer, a desktop computer, a personal digital assistant (PDA), a network computer, a wireless device, etc. The electronic device 600 includes a voltage source 110 (e.g., a battery and/or a component, a device, a circuit, etc., that is coupled to an external power source such as a plug), a voltage regulator 100 and an electronic component 605.

The electronic component 605 may be any combination of devices, components, circuits, and/or other hardware that may use power (e.g., a voltage) received from the voltage source 110. Examples of electronic components may include, but are not limited to, memory (e.g., random access memory (RAM), flash memory, etc.), circuits or components that may process audio, power amplifiers (PAs), image sensors (e.g., charge-coupled devices (CCDs) and/or complementary metal-oxide semiconductor (CMOS) devices), etc.

As discussed above, the voltage regulator 100 may regulate an input voltage received from the voltage source 110 and/or may pass the input voltage to the electronic component 605. In one embodiment, the voltage regulator 100 may regulate the input voltage provided by the voltage source 110 to generate the output voltage when the output voltage (generate by the voltage regulator) is greater than or equal to a first threshold voltage (as discussed above). In another embodiment, the voltage regulator 100 may regulate the input voltage provided by the voltage source 110 to generate the output voltage when the duty cycle is below a threshold duty cycle (as discussed above). In a further embodiment, the voltage regulator 100 may pass the input voltage provided by the voltage source 110 to the output of the voltage regulator without regulating the input voltage when the duty cycle of the voltage regulator 100 is greater than the threshold duty cycle and the output voltage is less than the first threshold voltage (as discussed above). In yet another embodiment, the voltage regulator 100 may resume regulating the input voltage provided by the voltage source 110 when the input voltage is greater than or equal to a second threshold voltage (as discussed above).

Figure 7:
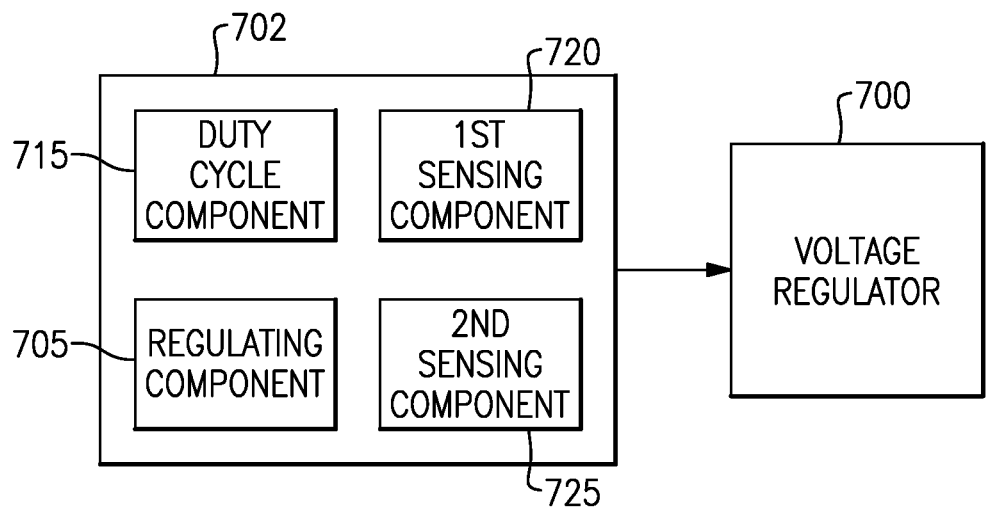
FIG. 7 is a block diagram illustrating a voltage regulator and a voltage detection module, according to one embodiment of the present disclosure.

FIG. 7 is a block diagram illustrating a voltage regulator 700 and a voltage detection module 702 according to one embodiment of the present disclosure. The voltage detection module includes a duty cycle component 715, a first sensing component 720, a second sensing component 725, and a regulating component 705. As illustrated in FIG. 7, the voltage detection module 702 may be separate from the voltage regulator 700 and may be coupled to the voltage regulator 700.

In one embodiment, the voltage regulator 700 may regulate an input voltage received from a voltage source and/or may pass the input voltage to an output of the voltage regulator based on the signals, messages, bits of data, etc., received from the voltage detection module 702. For example, the voltage detection module 702 may provide one or more signals to the voltage regulator 700 indicating that the voltage regulator 700 should regulate an input voltage when the first sensing component 720 determines that the output voltage (generated by the voltage regulator) is greater than or equal to a first threshold voltage (as discussed above). In another example, the voltage detection module 702 may provide one or more signals to the voltage regulator 700 indicating that the voltage regulator 700 should regulate an input voltage when the duty cycle component 715 determines that the duty cycle is below a threshold duty cycle (as discussed above). In a further example, the voltage detection module 702 may provide one or more signals to the voltage regulator 700 indicating that the voltage regulator 700 should pass the input voltage to the output of the voltage regulator 700 when the duty cycle component 715 determines that the duty cycle of the voltage regulator 700 is greater than the threshold duty cycle and when the first sensing component 720 determines that the output voltage is less than the first threshold voltage (as discussed above). In yet another example, the voltage detection module 702 may provide one or more signals to the voltage regulator 700 indicating that the voltage regulator 700 should resume regulating the input voltage provided by the voltage source when the second sensing component 725 determines that the input voltage is greater than or equal to a second threshold voltage (as discussed above).

Figure 8:
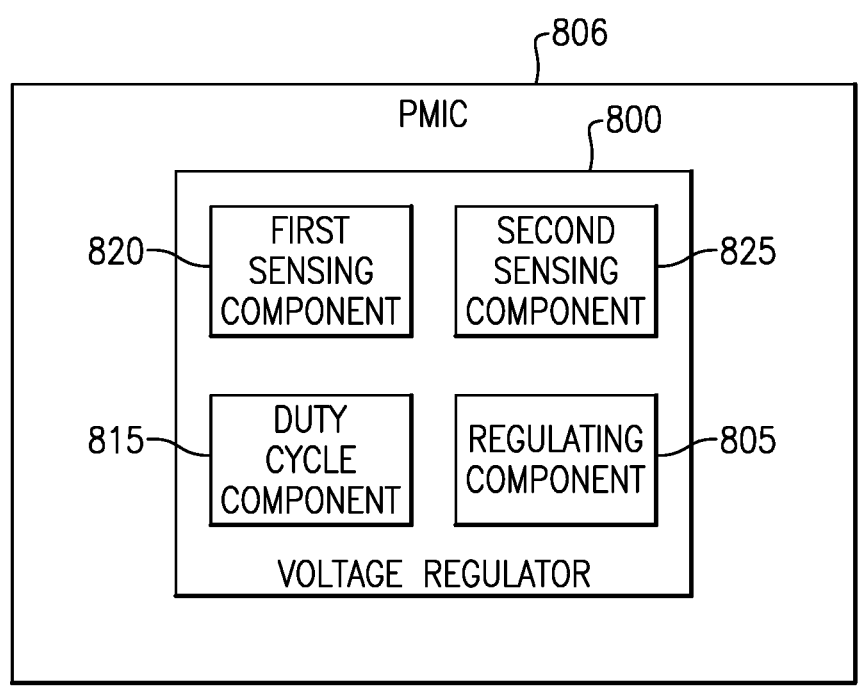
FIG. 8 is a block diagram illustrating an example voltage regulator, according to one embodiment of the present disclosure.

FIG. 8 is a block diagram illustrating an example voltage regulator 800, according to one embodiment of the present disclosure. The voltage regulator 800 may be included as part of an integrated circuit (IC) device or system such as a power management integrated circuit (PMIC) 806. The voltage regulator 800 is shown to include a regulating component 805, a first sensing component 820, a second sensing component 825, and a duty cycle component 815 having one or more features as described herein.

In some embodiments, the PMIC 806 of FIG. 8 may be implemented on a single chip, and may include one or more voltage regulators and one or more linear regulators. In some embodiments, such a PMIC may be configured to be used in devices including, for example, wireless devices such as cellular phones, or any devices that utilize voltage regulators. In other embodiments, the voltage regulator 800 may be implemented as a standalone discrete device (e.g., may be separate from the PMIC 806).

In some implementations, a device and/or a circuit having one or more features described herein may be included in an RF device such as a wireless device. Such a device and/or a circuit may be implemented directly in the wireless device, in a modular form as described herein, or in some combination thereof. In some embodiments, such a wireless device may include, for example, a cellular phone, a smart-phone, a hand-held wireless device with or without phone functionality, a wireless tablet, etc.

Figure 9:
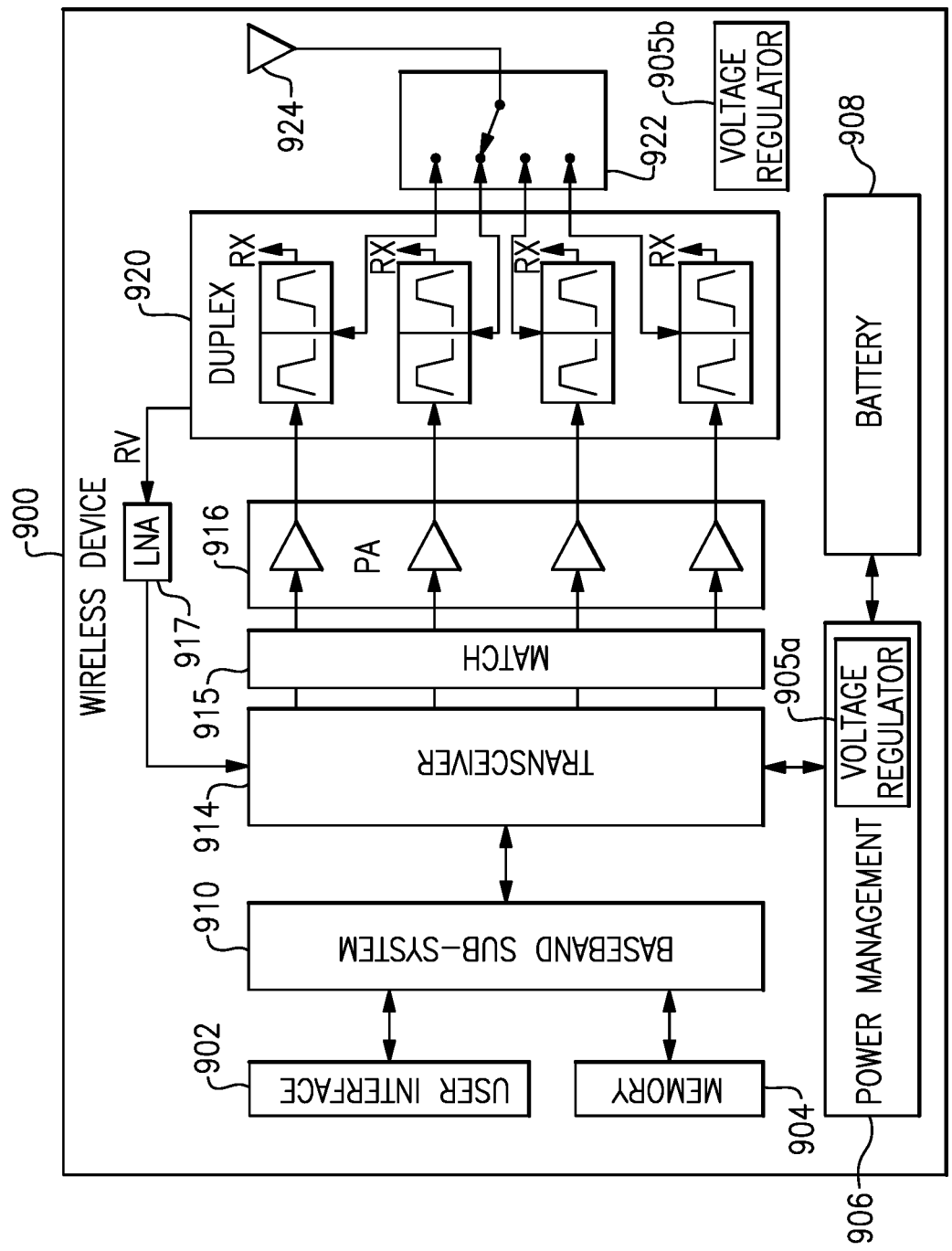
FIG. 9 depicts an example wireless device 900 having one or more advantageous features described herein.

FIG. 9 depicts an example wireless device 900 having one or more advantageous features described herein. In some embodiments, a transceiver 914 may be configured and operated to generate RF signals to be amplified and transmitted, and to process received signals. One or more power amplifiers (PAs) 916 may receive their respective RF signals from the transceiver 914 and amplify such RF signals for transmission. The amplified outputs of the PAs 916 are shown to be matched (via one or more matching circuits 915) and routed to an antenna 924 via their respective duplexer(s) 920 and an antenna switch module (ASM) 922.

In some embodiments, the duplexer(s) 920 may allow transmit and receive operations to be performed simultaneously using a common antenna (e.g., 924). As illustrated in FIG. 9, received signals are shown to be routed to one or more "RX" paths that may include, for example, one or more low-noise amplifiers (LNAs) 917. Received signals amplified by the LNA(s) 917 are shown to be routed to the transceiver 914 for further processing.

In FIG. 9, the transceiver 914 is shown to interact with a baseband sub-system 910 that is configured to provide conversion between data and/or voice signals suitable for a user and RF signals suitable for the transceiver 914. The transceiver 914 is also shown to be connected to a power management component 906 that is configured to manage power for the operation of the wireless device.

The baseband sub-system 910 is shown to be connected to a user interface 902 to facilitate various input and output of voice and/or data provided to and received from the user. The baseband sub-system 910 may also be connected to a memory 904 that is configured to store data and/or instructions to facilitate the operation of the wireless device, and/or to provide storage of information for the user.

In the example of FIG. 9, the power management component 906 may be implemented as a PMIC that includes a voltage regulator 905a having one or more features as described herein. In some embodiments, a voltage regulator 905b having one or more features as described herein may also be implemented as a standalone device outside of the PMIC.

A number of other wireless device configurations may utilize one or more features described herein. For example, a wireless device does not need to be a multi-band device. In another example, a wireless device may include additional antennas such as diversity antenna, and additional connectivity features such as Wi-Fi, Bluetooth, and GPS.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts may be performed as a single step and/or phase. Also, certain steps and/or phases may be broken into additional subcomponents to be performed separately. In some instances, the order of the steps and/or phases may be rearranged and certain steps and/or phases may be omitted entirely. Also, the methods described herein are to be understood to be open-ended, such that additional steps and/or phases to those shown and described herein may also be performed.

Some aspects of the systems and methods described herein may advantageously be implemented using, for example, computer software, hardware, firmware, or any combination of computer software, hardware, and firmware. Computer software may include computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that may be implemented using software to be executed on a general purpose computer may also be implemented using a different combination of hardware, software, or firmware. For example, such a module may be implemented completely in hardware using a combination of integrated circuits. Alternatively or additionally, such a feature or function may be implemented completely or partially using specialized computers designed to perform the particular functions described herein rather than by general purpose computers.

Multiple distributed computing devices may be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that may direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "include," "including," "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations. Furthermore, the terms "first," "second," "third," "fourth," etc., as used herein are meant as labels to distinguish among different elements and may not necessarily have an ordinal meaning according to their numerical designation.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure.

The teachings of the invention provided herein may be applied to other methods and systems, and are not limited to the methods and systems described above, and elements and acts of the various embodiments described above may be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A voltage regulator comprising:
    a duty cycle component configured to determine whether a duty cycle of the voltage regulator is greater than a threshold duty cycle;
    a first sensing component configured to determine whether an output voltage of the voltage regulator is less than a first threshold voltage;
    a regulating component, coupled to the duty cycle component and the first sensing component, the regulating component configured to pass an input voltage to an output of the voltage regulator based on a first determination that the duty cycle is greater than the threshold duty cycle and a second determination that the output voltage of the voltage regulator is less than the first threshold voltage; and
    a three-terminal switch implemented between the input voltage and the output of the voltage regulator, the three-terminal switch configured to allow coupling of the input voltage to the output of the voltage regulator based on the first determination and the second determination.

2. The voltage regulator of claim 1 wherein the regulating component is further configured to regulate the output of the voltage regulator based on a third determination that the duty cycle is less than or equal to the threshold duty cycle or a fourth determination that the output voltage of the voltage regulator is greater than or equal to the first threshold voltage.

3. The voltage regulator of claim 1 further comprising a second sensing component coupled to the regulating component, the second sensing component configured to determine whether the input voltage of the voltage regulator is greater than a second threshold voltage.

4. The voltage regulator of claim 3 wherein the regulating component is further configured to regulate the output of the voltage regulator based on a fifth determination that the input voltage of the voltage regulator is greater than the second threshold voltage.

5. The voltage regulator of claim 4 wherein the second threshold voltage is greater than the first threshold voltage.

6. An electronic device comprising:
    a voltage source configured to provide an input voltage; and
    a voltage regulator coupled to the voltage source, the voltage regulator including a duty cycle component configured to determine whether a duty cycle of the voltage regulator is greater than a threshold duty cycle, a first sensing component configured to determine whether an output voltage of the voltage regulator is less than a first threshold voltage, a regulating component, coupled to the duty cycle component and the first sensing component, the regulating component configured to pass the input voltage to an output of the voltage regulator based on a first determination that the duty cycle is greater than the threshold duty cycle and a second determination that the output voltage of the voltage regulator is less than the first threshold voltage, and a three-terminal switch implemented between the input voltage and the output of the voltage regulator, the three-terminal switch configured to allow coupling of the input voltage to the output of the voltage regulator based on the first determination and the second determination.

7. The electronic device of claim 6 wherein the regulating component is further configured to regulate the output of the voltage regulator based on a third determination that the duty cycle is less than or equal to the threshold duty cycle or a fourth determination that the output voltage of the voltage regulator is greater than or equal to the first threshold voltage.

8. The electronic device of claim 6 wherein the voltage regulator further includes a second sensing component coupled to the regulating component, the second sensing component configured to determine whether the input voltage of the voltage regulator is greater than a second threshold voltage.

9. The electronic device of claim 8 wherein the regulating component is further configured to regulate the output of the voltage regulator based on a fifth determination that the input voltage of the voltage regulator is greater than the second threshold voltage.

10. The electronic device of claim 9 wherein the second threshold voltage is greater than the first threshold voltage.

11. The electronic device of claim 9 wherein the first sensing component includes a first comparator.

12. The electronic device of claim 11 wherein the second sensing component includes a second comparator.

13. The electronic device of claim 12 wherein the first comparator is coupled to the output of the voltage regulator and a reference component.

14. The electronic device of claim 13 wherein the second comparator is coupled to the output of the voltage regulator and the reference component.

15. The electronic device of claim 6 wherein the regulating component includes a metal-oxide-semiconductor field-effect transistor (MOSFET).

16. The electronic device of claim 15 wherein the MOSFET is configured to pass the input voltage to the output of the voltage regulator or to regulate the output of the voltage regulator.

17. A method for operating a voltage regulator, the method comprising:
 determining whether a duty cycle of the voltage regulator is greater than a threshold duty cycle;
 determining whether an output voltage of the voltage regulator is less than a first threshold voltage; and
 passing an input voltage through a three-terminal switch of the voltage regulator to an output of the voltage regulator, the three-terminal switch implemented between the input voltage and the output of the voltage regulator and configured to allow coupling of the input voltage to the output of the voltage regulator based on a first determination that the duty cycle is greater than the threshold duty cycle and a second determination that the output voltage of the voltage regulator is less than the first threshold voltage.

18. The method of claim 17 further comprising regulating the output of the voltage regulator based on a third determination that the duty cycle is less than or equal to the threshold duty cycle or a fourth determination that the output voltage of the voltage regulator is greater than or equal to the first threshold voltage.

19. The method of claim 17 further comprising determining whether the input voltage of the voltage regulator is greater than a second threshold voltage.

20. The method of claim 19 further comprising regulating the output of the voltage regulator based on a fifth determination that the input voltage of the voltage regulator is greater than the second threshold voltage.

* * * * *